March 17, 1959    A. J. HILDENBRANDT, JR    2,877,785
JET BALANCING TRANSMITTING APPARATUS
Filed Jan. 11, 1954
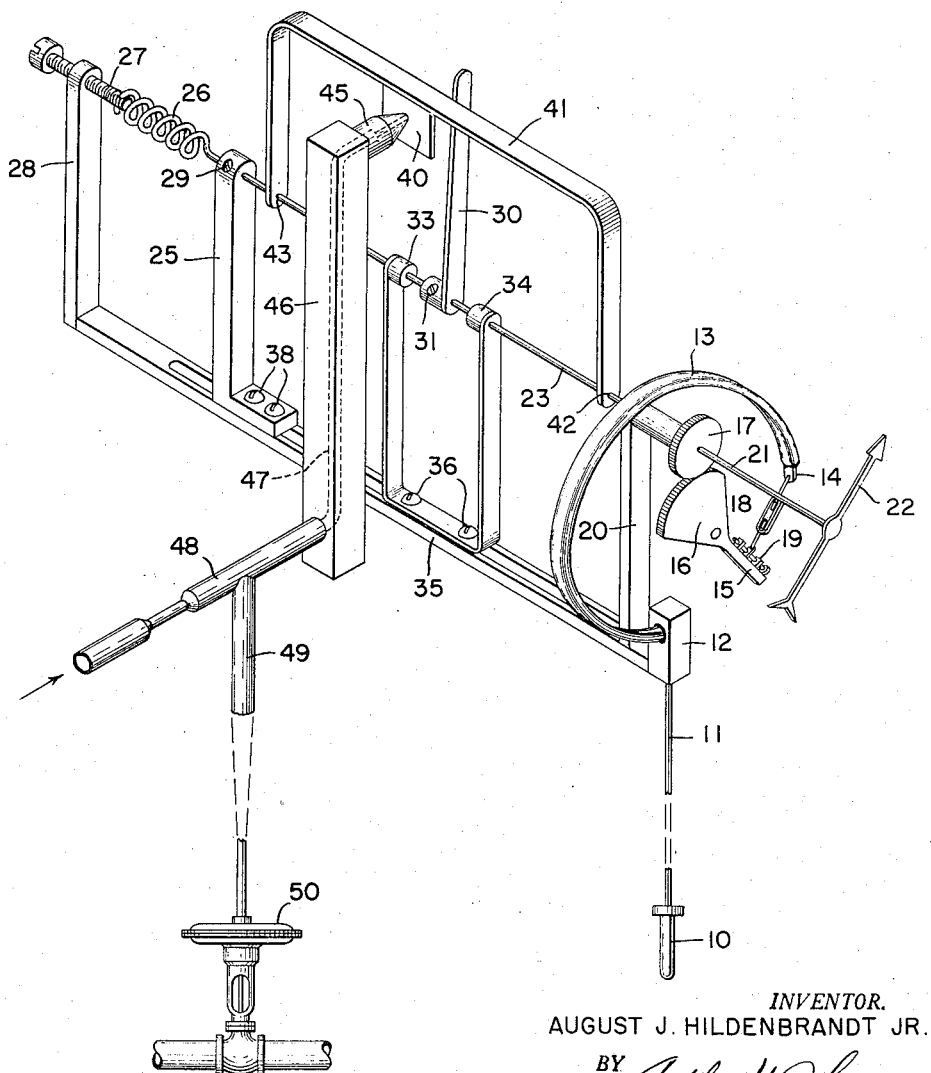
INVENTOR.
AUGUST J. HILDENBRANDT JR.
BY
ATTORNEY.

United States Patent Office 2,877,785
Patented Mar. 17, 1959

2,877,785

JET BALANCING TRANSMITTING APPARATUS

August J. Hildenbrandt, Jr., Rydal, Pa., assignor to Minneapolis-Honeywell Regulator Company, Minneapolis, Minn., a corporation of Delaware Application January 11, 1954, Serial No. 403,420

10 Claims. (Cl. 137—82)

A general object of the present invention is to provide a new and improved apparatus for transmitting a pneumatic pressure which is proportional to the magnitude of an input variable. More specifically, the present invention is concerned with a new and improved pressure transmitter of the jet balance type which is characterized by its linearity, simplicity, and ease of adjustment.

The present pressure transmitter is of the pneumatic jet force balance type. That is, it is one wherein a flapper unit has applied thereto an input force tending to move the flapper toward a nozzle. The nozzle has an air stream issuing therefrom which creates a reaction force on the flapper which opposes and may be made to balance the input force. If the input force to the flapper increases, the nozzle back pressure will build up and supply a high jet reaction force to balance the input.

In apparatus of the present type, it is desirable that there be a linear relation established between the input force to the flapper and the output pressure from the transmitter. The attainment of this linearity in a jet balance type of apparatus is dependent, in part, upon the spring gradient of the elements of the transmitter. To make the apparatus more useful and adaptable as a universal type of transmitter, it is desirable to provide means for varying the system spring gradient. In addition, the transmitter span, or range, and zero adjustments should be provided in such a manner that the adjustments will be simple and of a type which will introduce a minimum of error in the other adjustments of the transmitter. One form of pneumatic transmitter using the principle of linearizing a jet balance system by varying the apparatus spring gradient will be found in the copending application of Robert C. Whitehead, entitled "Control Apparatus," Serial No. 403,415, filed on January 11, 1954.

The basic element of the present invention is an elongated resilient member which is arranged to be twisted in accordance with the magnitude of an input variable. The effective spring gradient of this resilient member is varied by varying the length of the member. The position of a torque responsive element on the resilient member provides a span adjustment.

It is therefore a more specific object of the present invention to provide a new and improved pneumatic transmitter apparatus incorporating an elongated resilient member which is adapted to be twisted by an input torque and which member produces the movement of a flapper relative to a pneumatic nozzle to establish a proportional pneumatic pressure.

Another more specific object of the present invention is to provide a new and improved jet balance pneumatic transmitter utilizing an elongated resilient member which has a twisting motion imparted thereto and which carries a torque responsive member which operates upon a flapper with a force proportional to the twisting motion.

Still another more specific object of the present invention is to provide a new and improved jet balance transmitter incorporating a resilient member which is adapted to be twisted by an input motion and create a resultant force on a flapper unit which force is balanced by a reaction force from a pneumatic nozzle.

A further more specific object of the present invention is to provide a pneumatic transmitter incorporating an elongated resilient member whose effective spring gradient may be varied in a portion thereof to vary the span of the apparatus and varied in its total length to improve the linearity of the apparatus.

A still further object of the present invention is to provide an improved apparatus of the pneumatic jet balance type which incorporates a resilient member which is under tension with means for varying the initial angular deflection thereof to establish the zero for the apparatus and wherein the member is adapted to be subjected to torsional movement so as to deflect a torque responsive member carried thereby, the latter of which acts upon a flapper unit to provide a force on the flapper tending to move the flapper toward a nozzle having an air stream issuing therefrom and creating a reaction force on the flapper which balances the input force thereto.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there has been illustrated and described the preferred embodiments of the invention.

Referring to the single figure, the numeral 10 represents a variable sensing element, such as a thermometer bulb, which will produce an output pressure proportional to the magnitude of the temperature signal affecting the same. This bulb 10 is connected by way of a conduit 11 to a block 12, the latter of which has mounted therein a Bourdon spiral 13. The free end 14 of the spiral 13 is coupled to an arm 15 of a rack 16, the latter of which cooperates with a pinion gear 17. A turnbuckle connection 18 is provided between the end 14 and the arm 15 and a range adjustment is provided at 19.

The pinion gear 17 is mounted for rotation in a support member 20, the bearing therefore taking the form of a thrust bearing. Carried by the pinion gear 17 is a shaft 21 which connects to an indicator needle 22, the latter of which may cooperate with a suitable indicating dial, not shown.

Also fastened to the pinion gear 17 and extending through the support member 20 is an elongated resilient member 23 which may take the form of a straight wire. The wire 23 extends through a further support member 25 and connects to a tension spring 26, the latter of which is adjustable in accordance with the positioning of a threaded member 27 mounted in a support 28. A screw threaded member or other fastening means 29 may be used to rigidly fasten the member 23 in position after it has been initially adjusted for a desired zero position by the adjustable member 27.

Carried by the torsion member 23 is a torque responsive element 30 which is rigidly fastened to the element 23 by a suitable fastening means 31. A pair of support bearing members 33 and 34 are positioned on either side of the torque responsive element 30 and carry the weight of said element 30 so as to prevent any deflection of the member 23 due to the weight of the element 30. These bearings also prevent the feedback of any adverse reaction force to the member 23. The bearings 33 and 34 are carried by a U shaped member which is supported at its base by a slotted channel member 35 and is adapted to be locked in position by fastening means 36. The support 25 is also adapted for movement in the slotted channel member 35 and this support is arranged to be locked in position by fastening means 38.

Also included in the apparatus is a pneumatic flapper unit 40 which is carried by a frame 41, the latter being pivoted for movement about the element 23 at 42 and 43. These last two pivoting supports are preferable adjacent the support members 20 and 25 respectively so as to prevent the weight of the support member 41 from affecting the tensioning of the resilient member 23.

Cooperating with the flapper 40 is a nozzle 45 which is mounted in a suitable support 46 having a communicating opening 47 extending between the nozzle 45 and a supply conduit 48. Also connected to the supply conduit 48 is an output conduit 49 which leads to a suitable pneumatic valve 50 which may be used in any desired manner to affect the variable acting upon the bulb 10.

In considering the operation of the present apparatus, it will first be assumed that the bulb 10 is exposed to a predetermined variable, such as a temperature variable which will establish a reduction of the pressure condition in the conduit 11 so that the Bourdon spiral 13 will be deflected downwardly at the end 14 by an amount proportional to the pressure condition applied to the input thereof. For the particular input pressure, the end 14 will assume a predetermined position which will move the arm 15 of the rack 16 to follow this movement. The pinion gear 17 will in turn follow the movement of the rack 16 and cause the indicator needle 22 to be positioned accordingly.

With the elongated resilient member 23 being rigidly fastened in the support 25 by means 29, the twisting action imparted to the member 23 by the pinion gear 17 will result in a torque being applied to the torque responsive element 30. The element 30, bearing against the member 41, will push against the member 41 with a force proportional to the torque applied thereto by the torsion member 23. This force will tend to move the flapper 40 toward the nozzle 45. The air stream issuing from the nozzle 45 creates a reaction force on the flapper 40 and this force will balance the input force from the torque responsive member 30. For any one particular input force from the torque responsive member 30, the nozzle 45 will establish a predetermined reaction force which will be accompanied by a corresponding nozzle back pressure in the conduits 48 and 49. It should further be understood that when an increase in the temperature of the bulb occurs the torque responsive member 30 will be moved in a clockwise direction about the axis of element 23 and the pressurized fluid flowing from nozzle 45 against flapper 40 will cause the flapper to likewise be moved in a clockwise direction against the torque responsive member 30.

Should there be a pressure change within the Bourdon spiral 13, there will be a resultant repositioning of the pinion gear 17 and therefore a change in the amount of twisting motion imparted to the member 23. A changing of the twisting motion imparted to the member 23 will result in a change in the torque detected by the torque responsive element 30 and therefore there will be a corresponding change in the force tending to move the flapper 40 toward the nozzle 45. This will be accompanied by a corresponding change in the back pressure of the nozzle 45 and therefore a change in the positioning of the valve 50 which is controlled by that back pressure.

The alignment and adjustment of the apparatus is effected by first establishing a desired span. The span is set by first putting in a rough zero adjustment by twisting of the member 23 by adjustor 27. Next, the position of the torque responsive member 30 is moved along the member 23 until the length of the resilient member 23 between the member 30 and support 20 will produce the desired force change on flapper 40 as the right end of the member 23 is twisted through its full range of movement.

The next step in the alignment is the establishment of the total spring gradient of the member 23, which will be determined by the effective length of the member. The effective length is varied by loosening the locking means 29 and 38 and moving the support 25 to a desired position which, when the support is reattached, will give a linear change in output pressure with a linear input.

After span and linearity have been established, the zero adjustment may be made and this is by way of the adjustor 27 and spring 26 which, when fastening means 29 is loosened, will set in a desired twist into the resilient member 23. After set, the fastening means 29 is again fastened to finally hold the member 23. It will be further apparent that the zero adjustment may be accomplished by movement of the nozzle assembly relative to the flapper by pivoting the assembly about an axis defined by the resilient member 23. It is sometimes necessary to go back over the adjustments in the above order to eliminate the effects of secondary reactions occurring between the principal adjustments, although this is not always of importance.

It will be obvious, that the supporting pivots 33 and 34 must be moved at the same time and when the torque responsive element has been finally positioned, the fastening means 36 may be tightened so as to lock the support member for the pivots 33 and 34 in position in the base channel member 35.

The relative spring gradients of the input system including the spiral 13 and the indicator mechanism are relatively high compared to those of the transmitter portion of the apparatus including the torsion member 33. Having this relationship of gradients, it is possible to calibrate the two sections independently with a minimum of interference. In the transmitter portion of the apparatus, it will be readily apparent that other means may be provided for varying the effective length of the torsion member 23 so that the spring gradient thereof will be of a magnitude which will give the desired linearity relationship.

While, in accordance with the provisions of the statutes, there has been illustrated and described the best forms of the embodiments of the invention known, it will be apparent to those skilled in the art that changes may be made in the forms of the apparatus disclosed without departing from she spirit of the invention as set forth in the appended claims and that in some instances certain features of the invention may be used to advantage without a corresponding use of other features.

Having now described my invention, what I claim as new and desire to secure by Letters Patent is:

1. A pneumatic pressure transmitter comprising, an elongated member, a means operably positioned at one end of said member to apply an input torque thereto, a torsion spring operably connected to the other end of said member to apply a tensile force thereto, a torque responsive member operably connected to said member, said member and said torque responsive means being adapted to move in accordance with the magnitude of said input torque, a flapper having a force applied thereto by said torque responsive member which is proportional to the magnitude of said input torque and a pneumatic nozzle positioned with its nozzle opening adjacent said flapper and adapted to have the back pressure thereof varied in accordance with the position of said flapper.

2. A pneumatic pressure transmitter comprising, a wire member, adjustable spring means operably connected to one end of said wire member to create a tensile stress within said member, holding means for retaining said member in said stressed condition, means operably connected to the other end of said wire to twist said wire in accordance with the magnitude of an input variable, a torque responsive member fastened to said wire at a point displaced from the means for twisting said wire, a flapper member having a force applied thereto by said torque responsive member which is proportional to the twist of said wire and a pneumatic nozzle positioned with its nozzle opening adjacent said flapper in such a manner that the back pressure thereof will vary in accordance with the torque applied to said torque responsive member.

3. Apparatus for producing a pressure proportional to an input motion comprising, an elongated resilient member under tension having one end thereof fixedly attached to a stationary member, means operably connected to the other end of said member to twist said member, a torque responsive element fastened to said member intermediate the ends thereof and having a torque applied thereto proportional to the amount said member is twisted, a flapper member having a force applied thereto by said torque responsive member that is proportional to the twist of said member, and a pneumatic nozzle positioned with its nozzle opening adjacent said flapper and adapted to have the back pressure thereof varied in accordance with the torque applied by said torque responsive member to said flapper member.

4. Apparatus for producing a pressure proportional to an input motion comprising, an elongated resilient member under tension having one end thereof fixedly attached to a stationary member, means for twisting the other end of said member, a torque responsive element fastened to said member intermediate the ends thereof and having a torque applied thereto proportional to the amount said member is twisted, a flapper member positioned by said torque responsive member, and having a force applied thereto proportional to the twisting of said member, and a pneumatic nozzle having an air stream issuing therefrom positioned with its nozzle opening adjacent said flapper to produce on said flapper a reaction force to balance the input force applied to said flapper, said nozzle having a back pressure which varies in accordance with the magnitude of the reaction force required to balance the input force to said flapper.

5. Apparatus for producing a pressure which varies in accordance with the magnitude of a mechanical motion, comprising, an elongated resilient member, means for applying a tensile force to said member, an input torque producing means connected to said member for twisting one end of said member, a torque responsive member fastened to said resilient member, a flapper member adapted to have a force applied thereto by said torque responsive member, a pneumatic nozzle positioned with its nozzle opening adjacent said flapper and having a jet reaction force acting on said flapper to balance the input force to said flapper, said nozzle having a back pressure proportional to the reaction force necessary to balance the force input to said flapper.

6. Apparatus for producing a pressure which varies in accordance with the magnitude of a mechanical motion, comprising, an elongated resilient member, means for placing said member under tension, an input torque producing means connected to said member for twisting one end of said member, a torque responsive member fastened to said resilient member, a flapper member adapted to have a force applied thereto by said torque responsive member, a pneumatic nozzle positioned with its nozzle opening adjacent said flapper and having a jet reaction force acting on said flapper to balance the input force to said flapper, said nozzle having a back pressure proportional to the reaction force necessary to balance the force input to said flapper and wherein said flapper member is pivoted for movement about the elongated axis of said resilient member.

7. Apparatus for producing a pressure which varies in accordance with the magnitude of a mechanical motion, comprising, an elongated resilient member, means for placing said member under tension, an input torque producing means connected to said member for twisting one end of said member, a torque responsive member fastened to said resilient member, a flapper member adapted to have a force applied thereto by said torque responsive member, a pneumatic nozzle positioned with its nozzle opening adjacent said flapper and having a jet reaction force acting on said flapper to balance the input force to said flapper, said nozzle having a back pressure proportional to the reaction force necessary to balance the force input to said flapper and wherein the effective length of said resilient member is variable to vary the linearity of the apparatus by the resultant changes in the spring gradient thereof.

8. Apparatus for producing a pressure which varies in accordance with the magnitude of a mechanical motion, comprising, an elongated resilient member, means for placing said member under tension, an input torque producing means connected to said member for twisting one end of said member, a torque responsive member fastened to said resilient member, a flapper member adapted to have a force applied thereto by said torque responsive member, a pneumatic nozzle positioned with its nozzle opening adjacent said flapper and having a jet reaction force acting on said flapper to balance the input force to said flapper, said nozzle having a back pressure proportional to the reaction force necessary to balance the force input to said flapper and wherein said torque responsive member has pivoting supports surrounding said resilient member adjacent said torque responsive member to bear adverse reaction forces.

9. A pneumatic pressure transmitter comprising, an elongated resilient member, means including a spring connected to one end of said member to place said member under tension, a rotatable thrust bearing fastened to the other end of said resilient member and providing an input connection for applying a torque to said resilient member, a support for said resilient member adjacent said spring, said support being adapted for movement along the axis of said resilient member and adapted for rigid fastening to said member to determine the effective length thereof, means responsive to the torque of said resilient member adjustably fastened to said member at a point intermediate said support and said bearing, a flapper member having a force applied thereto by said last named means, and a nozzle having an outlet adjacent said flapper with an air stream issuing therefrom, said nozzle having a back pressure sufficient to cause the air stream striking said flapper to provide a reaction force to balance the input force applied to said flapper.

10. Apparatus for producing a pressure which varies in accordance with the magnitude of a mechanical motion, comprising, an elongated resilient member, means for applying a tensile force to said member, an input torque producing means connected to said member for twisting one end of said member, a torque responsive member fastened to said resilient member, a flapper member adapted to have a force applied thereto by said torque responsive member, a pneumatic nozzle positioned with its nozzle opening adjacent said flapper and having a jet reaction force acting on said flapper to balance the input force to said flapper, said nozzle having a back pressure proportional to the reaction force necessary to balance the force input to said flapper and wherein said torque responsive member is adapted to be moved along the elongated axis of said resilient member to vary the span thereof.

References Cited in the file of this patent

UNITED STATES PATENTS

| | | |
|---|---|---|
| 2,599,159 | Breedlove | June 3, 1952 |
| 2,666,443 | Eckman | Jan. 19, 1954 |

FOREIGN PATENTS

| | | |
|---|---|---|
| 551,159 | Great Britain | Feb. 10, 1943 |